(12) United States Patent
Song et al.

(10) Patent No.: US 11,864,490 B2
(45) Date of Patent: Jan. 9, 2024

(54) CONTROL DEVICE, WORK SYSTEM, WORK MACHINE, AND CONTROL METHOD

(71) Applicant: HONDA MOTOR CO., LTD., Tokyo (JP)

(72) Inventors: Wei Song, Wako (JP); Takuya Kanisawa, Wako (JP); Taro Yokoyama, Wako (JP); Hiroto Takahashi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 400 days.

(21) Appl. No.: 17/179,445

(22) Filed: Feb. 19, 2021

(65) Prior Publication Data

US 2021/0274704 A1 Sep. 9, 2021

(30) Foreign Application Priority Data

Mar. 6, 2020 (JP) .................. 2020-039111

(51) Int. Cl.
*A01D 34/74* (2006.01)
*G06T 7/60* (2017.01)
*G07C 5/04* (2006.01)
*A01D 34/00* (2006.01)
*A01D 101/00* (2006.01)

(52) U.S. Cl.
CPC .......... *A01D 34/008* (2013.01); *A01D 34/74* (2013.01); *G06T 7/60* (2013.01); *G07C 5/04* (2013.01); *A01D 2101/00* (2013.01); *G06T 2207/30188* (2013.01); *G06T 2207/30252* (2013.01)

(58) Field of Classification Search
CPC .. A01D 34/008; A01D 34/74; A01D 2101/00; G06T 7/60; G06T 2207/30188; G06T 2207/30252; G07C 5/04
USPC .......................................................... 701/50
See application file for complete search history.

(56) References Cited

U.S. PATENT DOCUMENTS

| | | | |
|---|---|---|---|
| 2011/0166701 A1* | 7/2011 | Thacher | A01G 25/00 700/245 |
| 2018/0352730 A1* | 12/2018 | Gorenflo | A01D 34/008 |
| 2018/0353040 A1 | 12/2018 | Matt et al. | |

(Continued)

FOREIGN PATENT DOCUMENTS

| CN | 101196744 A | * 6/2008 | .......... G05D 1/0225 |
|---|---|---|---|
| JP | 11-089373 | 4/1999 | |

(Continued)

OTHER PUBLICATIONS

Extended European Search Report for European Patent Application No. 21158568.2 dated Jul. 27, 2021.

(Continued)

*Primary Examiner* — Mahmoud Gimie
(74) *Attorney, Agent, or Firm* — Amin Turocy & Watson, LLP

(57) ABSTRACT

A control device includes a control unit configured to acquire individual information indicating a state of a predetermined member of a work machine configured to execute work using the predetermined member, and instruct a state adjustment mechanism configured to adjust the state to adjust the state so that a difference between the state indicated by the individual information and a reference value of the state common to other work machines is reduced.

8 Claims, 6 Drawing Sheets

(56) References Cited

U.S. PATENT DOCUMENTS

2019/0230850 A1     8/2019   Johnson et al.
2019/0387671 A1*   12/2019   Umemoto .............. A01D 34/74

FOREIGN PATENT DOCUMENTS

| JP | 2005-148873 | | 6/2005 | |
|----|----|----|----|----|
| JP | 2019-079171 | | 5/2019 | |
| SE | 1350202 | A1 * | 8/2014 | ........... A01D 34/008 |
| WO | 2014/007694 | | 1/2014 | |

OTHER PUBLICATIONS

Japanese Office Action for Japanese Patent Application No. 2020-039111 dated Jun. 20, 2023.

\* cited by examiner

CONTROL DEVICE, WORK SYSTEM, WORK MACHINE, AND CONTROL METHOD

CROSS-REFERENCE TO RELATED APPLICATION

Priority is claimed on Japanese Patent Application No. 2020-039111, filed Mar. 6, 2020, the content of which is incorporated herein by reference.

BACKGROUND OF THE INVENTION

Field of the Invention

The present invention relates to a control device, a work system, a work machine, and a control method.

Description of Related Art

With the development of automatic control technology, devices that perform various types of work have been developed. For example, lawn mowers and cleaners are becoming widespread as work machines that perform predetermined work while autonomously moving in a predetermined work area. In the work, some members of the work machine act on a surface of the work area. As a state of the member changes over time, a finished state of the work may change. Therefore, a function of detecting the state of the member has been proposed.

For example, Japanese Unexamined Patent Application, First Publication No. 2019-79171 describes a moving body including a plurality of driving wheels, a plurality of motors connected to the plurality of driving wheels, respectively, an external sensor that repeatedly scans an environment and outputs sensor data for each scan, a first position estimation device that sequentially generates and outputs first position information indicating an estimated value of a position and attitude of the moving body on the basis of the sensor data, a second position estimation device that acquires a measured value or estimated value of a rotation speed of each of the plurality of driving wheels and sequentially generates and outputs second position information indicating the estimated values of the position and attitude of the moving body on the basis of the measured value or estimated value, and a calculation circuit that performs a wear determination on the plurality of driving wheels on the basis of a difference between a displacement of the moving body calculated on the basis of the first position information and a displacement of the moving body calculated on the basis of the second position information and outputs a signal indicating a result of the wear determination.

Japanese Unexamined Patent Application, First Publication No. 2005-148873 describes a robot deterioration diagnostic device including a data storage unit that reads and stores a property data group each time data of the property data group is updated, from a robot control device that records the property data group as data to be used for deterioration diagnosis each time one cycle reproduction operation is completed in a work program to be used for the deterioration diagnosis, a data analysis unit that reads the property data group stored in the data storage unit and analyzes the property data group using a statistical scheme, and a deterioration diagnosis unit that diagnoses mechanical deterioration symptoms of a robot arm on the basis of an analysis result in the data analysis unit.

SUMMARY OF THE INVENTION

When a work area is wide or when work is completed in a short time, a series of common work may be shared by a plurality of devices. Since a state of members can differ for each work machine, a finished state of the work may differ for each device. Therefore, making the finished state uniform among a plurality of work machines is anticipated.

Aspects according to the present invention have been made in view of the above points, and an object of the present invention is to provide a control device, a work system, a work machine, and a control method capable of making a finished state uniform among a plurality of work machines.

In order to solve the above problem and achieve the object, the present invention has adopted the following aspects.

(1) A control device according to an aspect of the present invention includes a control unit configured to acquire individual information indicating a state of a predetermined member of a work machine configured to execute work using the predetermined member, and instruct a state adjustment mechanism configured to adjust the state to adjust the state so that a difference between the state indicated by the individual information and a reference value of the state common to another work machine is reduced.

(2) In the aspect (1), the control unit may receive individual information from the other work machine, and adopt a state indicated by the received individual information as the reference value.

(3) In the aspect (1), the control unit may acquire measurement information on a state of a predetermined sign that gives the reference value, and instruct the state adjustment mechanism to adjust the state indicated by the individual information so that a difference between the state indicated by the measurement information and the reference value is reduced.

(4) In any one of the aspects (1) to (3), the control unit may analyze evaluation-related information indicating a relationship between the individual information and evaluation information indicating a target object state, the state being a state of the work target object after work, and determine the state indicated by the individual information corresponding to a predetermined target object state common to the other work machine to be the reference value on the basis of the evaluation-related information.

(5) In any one of the aspects (1) to (4), the control unit may acquire at least an elapsed time from a date and time when the state was last adjusted to a current point in time, refer to property data indicating a time change in the state of the member to determine an amount of change of the state corresponding to the acquired elapsed time, and instruct the state adjustment mechanism to adjust the state when the determined amount of change exceeds a predetermined limit value of the amount of change.

(6) In any one of the aspects (1) to (5), the work machine may include a car body having wheels traveling on a ground surface and the state adjustment mechanism installed therein; a cutter blade, the state adjustment mechanism being connected to the cutter blade; and a height detection unit configured to detect a height of the cutter blade as the state, and the state adjustment mechanism may be a height adjustment mechanism configured to adjust the height.

(7) A work system according to an aspect of the present invention includes: a plurality of the work machines; and any one of the aspects (1) to (6).

(8) A work machine according to an aspect of the present invention includes: a control unit configured to acquire individual information indicating a state of a member configured to execute predetermined work, and instruct a state adjustment mechanism configured to adjust the state to adjust the state so that a difference between the state indicated by the individual information and a reference value of the state common to another work machine is reduced.

(9) A control method according to an aspect of the present invention is a control method in a control device, and includes: acquiring individual information indicating a state of a predetermined member of a work machine configured to execute work using the predetermined member; and instructing a state adjustment mechanism configured to adjust the state to adjust the state so that a difference between the state indicated by the individual information and a reference value of the state common to another work machine is reduced.

According to the aspects (1), (7), (8) or (9), a difference in the state of the member among the plurality of work machines that perform the common work is reduced or eliminated. Therefore, it is possible to make the finished state of the work uniform among the plurality of work machines.

According to the aspect (2), the state of the member of the own machine can approximate or match states of members of other work machines.

According to the aspect (3), the state of the member of the own machine can approximate or match the reference value given by the sign.

According to the aspect (4), the reference value of the state of the member is given on the basis of a state of a work target object after the common work among the plurality of work machines, and the state of the member is adjusted to approximate or match the reference value. Therefore, it is possible to further reduce the difference in the finished state of the work due to an individual difference in a configuration of the work machine.

According to the aspect (5), the state of the member in each work machine is adjusted so that the amount of change in the state of the member over time does not exceed the predetermined limit value of the amount of change. Therefore, it is possible to keep the state of the member within a range defined by the limit value as much as possible among the plurality of work machines.

According to the aspect (6), a difference in height of the cutter blades among the plurality of work machines is reduced or eliminated. Therefore, lengths of the lawn after mowing as a finished state of the work are made uniform among the plurality of work machines, and moving unevenness is reduced or eliminated.

DETAILED DESCRIPTION OF THE INVENTION

First Embodiment

Hereinafter, a first embodiment of the present invention will be described with reference to the drawings.

Figure 1:
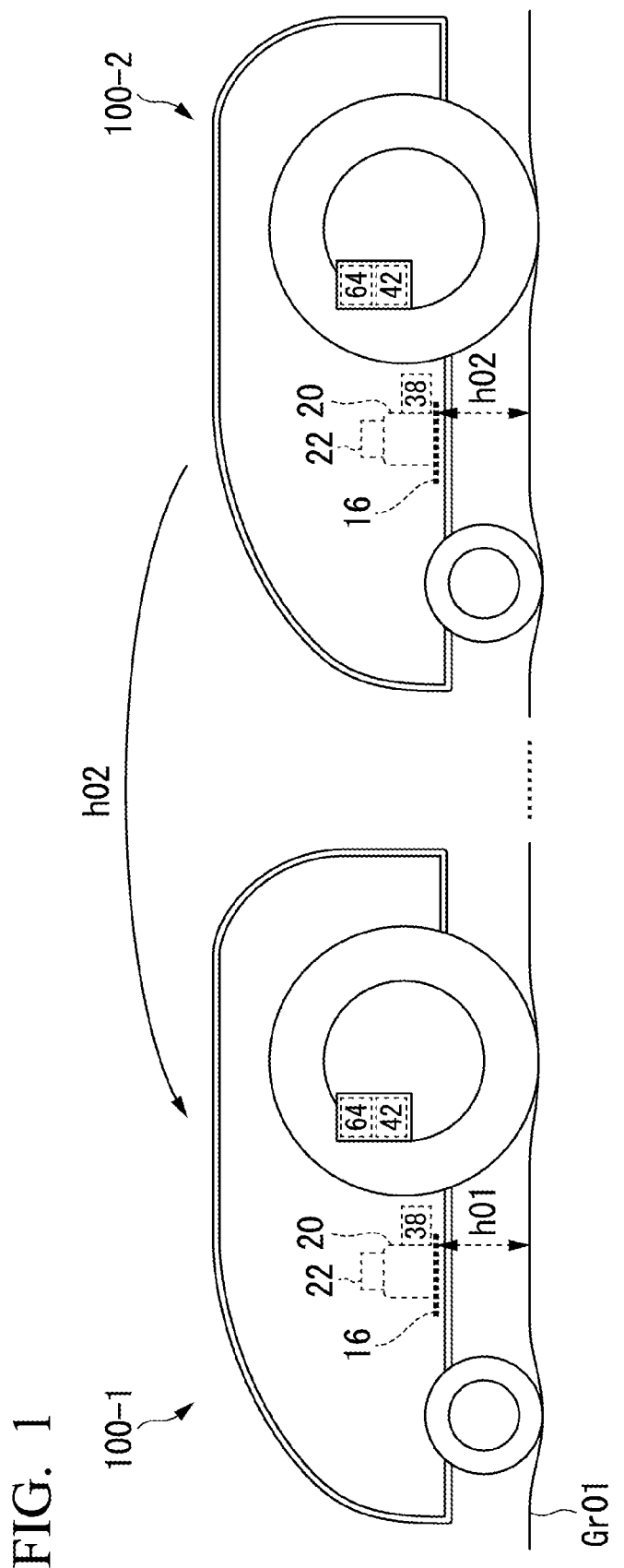
FIG. 1 is an illustrative diagram illustrating an example of a work system according to a first embodiment.

FIG. 1 is an illustrative diagram illustrating an example of a work system S1 according to the embodiment. In the example illustrated in FIG. 1, the work system S1 includes two work machines 100, and the work machines 100 have common configurations unless otherwise specified and are distinguished by child numbers, like work machines 100-1, 100-2, and the like. In the following description, a case in which the work machine 100 is mainly configured as a four-wheel self-propelled electric lawn mower will be taken as an example. The work machine 100 drives a work motor 20 to rotate a cutter blade (hereinafter referred to as a blade 16), and mows plants such as grass that covers the ground surface Gr01, such as grass in contact with the rotated blade 16.

The work machine 100 includes a height adjustment mechanism 22 for measuring a height from the ground surface Gr01 to the blade 16 using a height sensor 38, and eliminating a difference between the measured height and a reference value of a predetermined height. As the reference value of the height, a height in any one of the work machines 100 is used. In the example illustrated in FIG. 1, the work machine 100-2 serves as a reference machine, and the work machine 100-1 is an adjustment machine that is a height adjustment target. The adjustment machine also includes a work machine management device that adjusts the height of the blade 16 to a reference value as a state of a member of the own machine.

On the other hand, an electric control unit (ECU) 42 of the work machine 100-2, which serves as the reference machine, wirelessly transmits a height h02 measured in the work machine to the work machine 100-1 using a communication unit 64. An ECU 42 of the work machine 100-1 adjusts a height h01 measured by the height sensor 38 of the work machine 100-1 so that the height approximates or matches a reference value h02 notified of by the work machine 100-2. Through the adjustment, a difference Δh between the reference value h02 and the height h01 from the ground surface Gr01 to the blade 16 is reduced or eliminated.

Figure 2:
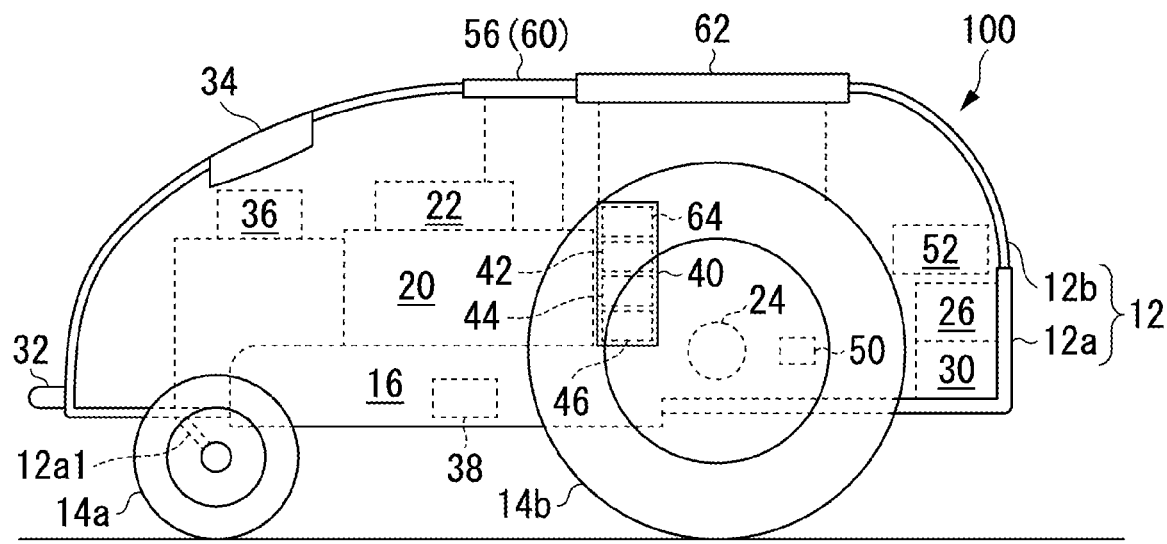
FIG. 2 is a side view of a work machine according to the first embodiment.
Figure 3:
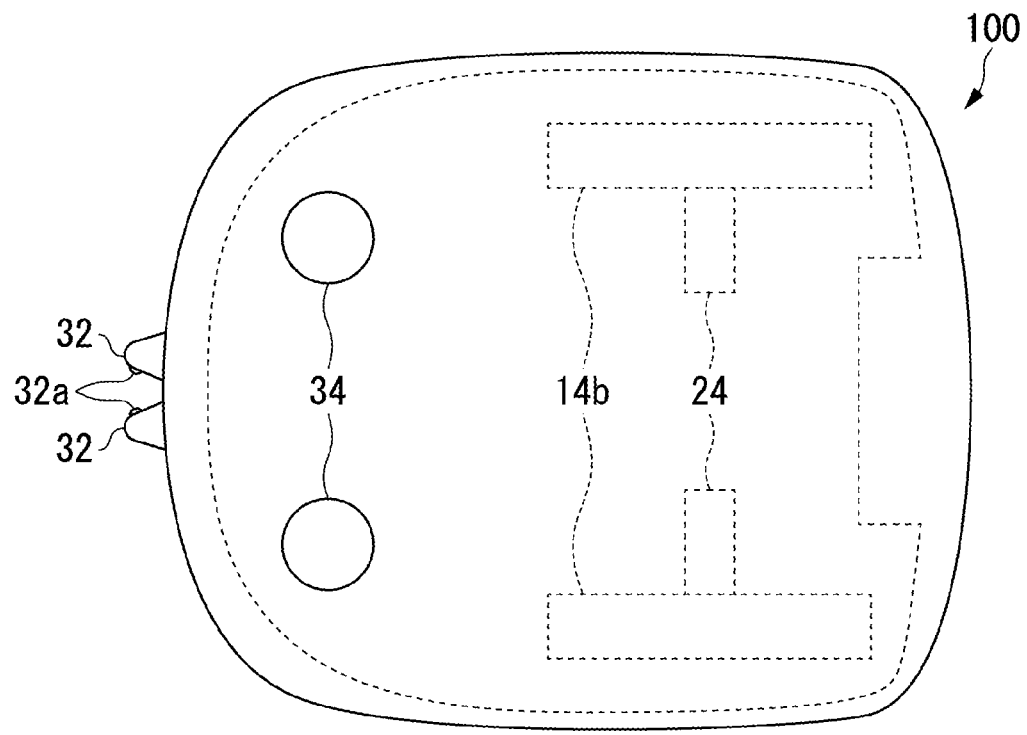
FIG. 3 is a plan view of the work machine according to the first embodiment.
Figure 4:
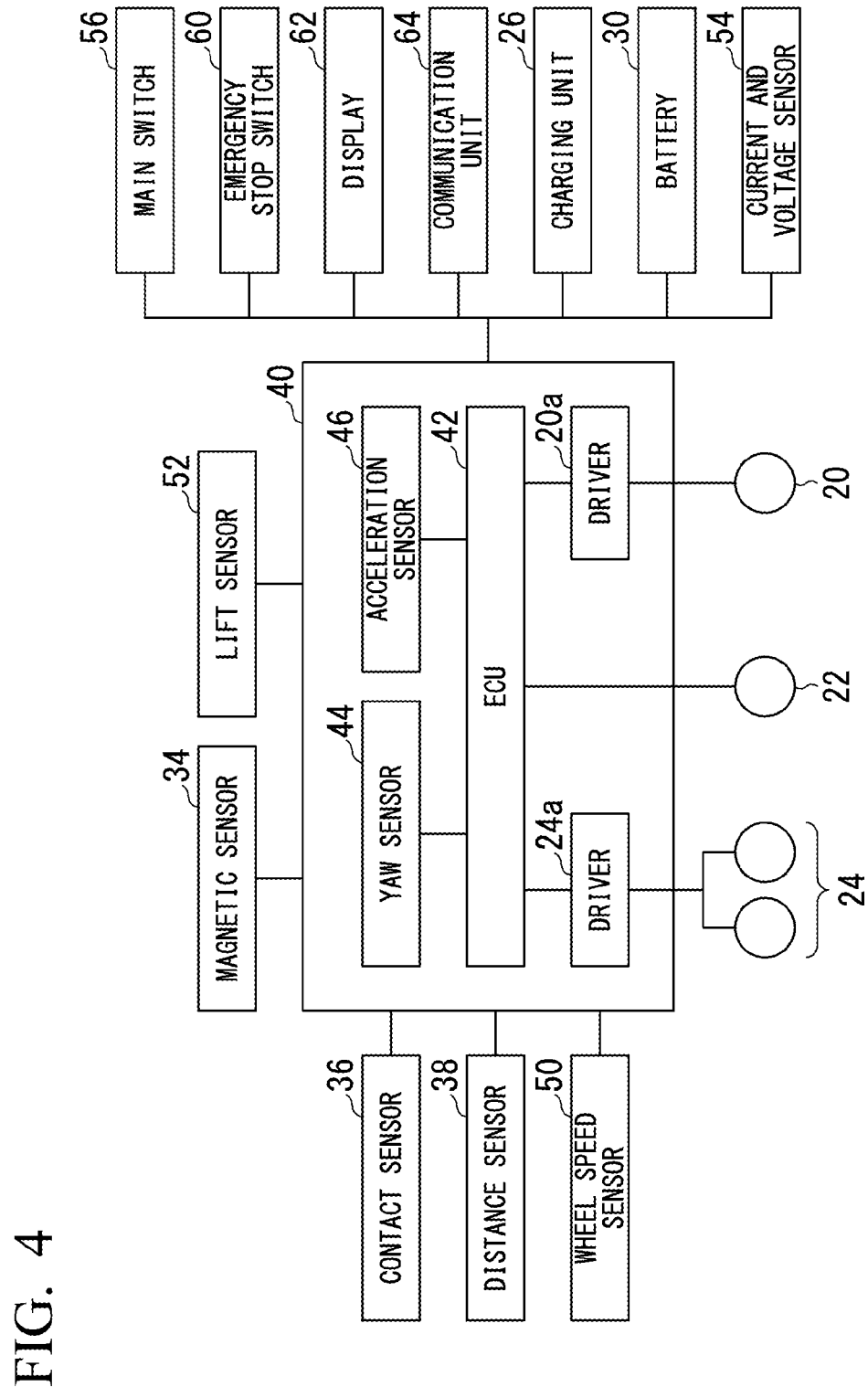
FIG. 4 is a block diagram of the work machine according to the first embodiment.

Next, a configuration example of the work machine 100 according to the present embodiment will be described. FIG. 2 illustrates a side view of the work machine 100 according to the present embodiment. FIG. 3 illustrates a plan view of the work machine 100 according to the present embodiment. FIG. 4 illustrates a block diagram of the work machine 100 according to the present embodiment. The work machine 100 includes a vehicle body 12 and wheels 14. The vehicle body 12 includes a chassis 12a and a frame 12b attached to the chassis 12a. The chassis 12a includes a stay 12a1 at a position closer to one end (hereinafter, a front end) in a longitudinal direction than a center, and the stay 12a1 fixes the front wheels 14a to the left and right in the longitudinal direction of the chassis 12a. The chassis 12a fixes rear wheels 14b to the left and right in the longitudinal direction at positions closer to the other end (hereinafter, a rear end) in the longitudinal direction than the center. A diameter of the rear wheel 14b is larger than a diameter of the front wheel 14a. The wheel 14 comes in contact with the ground surface Gr01 and supports the work machine 100. A direction from the rear end to the front end is called forward, and an opposite direction is called backward. A size of the work machine 100 is arbitrary, but is typically about 600 mm in total length, 300 mm in total width, and 300 mm in height.

The blade 16 is installed at a center of the chassis 12a, and the work motor 20 is arranged in a direction away from the ground surface Gr01 (hereinafter, an upward or height direction) in a state in which the wheels 14 come in contact with the ground surface Gr01 below the blade 16. The work motor 20 receives power and rotates around a rotation shaft to rotate the blade 16 connected to its own portion. The height adjustment mechanism 22 is connected to the blade 16, and the height adjustment mechanism 22 can adjust the height from the ground surface Gr01 so that the height approximates or matches a reference value indicated by a height adjustment signal input from the ECU 42. A configuration of the height adjustment mechanism 22 may be either a mechanical type or a fluid-operated type. The mechanical type height adjustment mechanism includes a rotation shaft in a height direction, and has a screw (not illustrated) connected to the work motor 20 and a motor (not illustrated) for rotating the screw. The screw rotates around the rotation shaft under the control of the ECU 42 such that the height of the blade 16 can be changed. The fluid-operated type height adjustment mechanism 22 includes a piston (not illustrated) including, at one end, a movable sealing material of which the inside thereof is filled with a fluid, which seals the fluid, and which is connected to the work motor 20, and including, at the other end, a pressurizing material which seals the fluid and applies pressure to the fluid, and an actuator (not illustrated) for pressing the pressurizing material. The pressurizing material can change the pressure of the fluid inside the piston through pressing under the control of the ECU 42 to change the height of the blade 16.

The height adjustment mechanism 22 may include a control circuit (not illustrated) for performing control with the indicated reference value as a target value so that a difference value between the target value and an observed value recursively approximates zero. Here, a measured value of the height of the blade 16 is applied as the observed value. The measured value of the height of the blade is a sum of the height notified of by the height sensor 38 and a predetermined correction value (to be described below). The control circuit may be a circuit capable of executing a process of minimizing the difference value between the target value and the observed value, such as a PI circuit that executes PI control and a PID circuit that executes PID control.

The height sensor 38 is installed in the vicinity of the blade 16 and is connected to the height adjustment mechanism 22 via the work motor 20. The height sensor 38 measures the height from the ground surface Gr01 and outputs a height measurement signal indicating the measured height to the ECU 42. Due to this arrangement, a relative positional relationship between the blade 16 and the height sensor 38 does not change, and the height of the height sensor 38 changes according to the change in the height of the blade 16. The ECU 42 derives a height (hereinafter referred to as a measured height) of the blade 16 corrected by adding a correction value set in advance from the measured height. The correction value corresponds to a difference between the height of the blade 16 and the height of the height sensor 38, and is determined by the positional relationship between the blade 16 and the height sensor 38. In the following description, the measurement of the height using the height sensor 38 and the calculation of the height of the blade 16 through addition of the measured height to the correction value may be collectively referred to as simply measurement of the height of the blade 16.

The height sensor 38 includes a radiation member that emits waves having a known characteristic as reference waves, and a detection member for detecting a phase difference between reflected waves generated due to reflection on the ground surface Gr01 and the reference waves. The height sensor 38 can acquire the height from the ground surface Gr01 from the detected phase difference and a propagation velocity of the reference waves. The height sensor 38 may be a height sensor that uses any measurement principle, such as an infrared sensor that uses infrared rays as the reference waves and an ultrasonic sensor that uses ultrasonic waves as the reference waves.

When the own machine serves as a reference machine, the ECU 42 transmits a height measurement signal indicating a measured height of the own machine to another work machine using the communication unit 64. In the reference machine, the ECU 42 does not adjust the height of the blade 16.

When the own machine serves as an adjustment machine, the ECU 42 receives the height measurement signal from the reference machine using the communication unit 64. The ECU 42 outputs a height adjustment signal indicating the height indicated by the received height measurement signal (hereinafter, a reference height) as a height control target to the height adjustment mechanism 22. Accordingly, the measured height is adjusted so that the height approximates or matches the reference height.

Whether the own machine serves as the reference machine or the adjustment machine may be set in the ECU 42 in advance, or may be set by an operation of a user. The work machine 100 includes, for example, an operation panel (not illustrated), and the ECU 42 displays a setting menu on a display 62 so that whether the own machine serves as the reference machine or the adjustment machine can be selected on the basis of an operation input received by the operation panel. The operation panel may be a separate member juxtaposed with the display 62, or may be a member integrally configured with the display 62 by superimposing a touch sensor on a display area.

A traveling motor 24 is installed at a position closer to the rear end than the center of the chassis 12a. The traveling motor 24 is connected to the rear wheels 14b, receives power, and rotates around the rotation shaft to rotate the connected rear wheels 14b as driving wheels. By driving the rear wheels 14b, it is possible to cause the work machine 100 to travel with the front wheels 14a as driven wheels. The work motor 20 and the traveling motor 24 are covered with the frame 12b, and the blade 16 is accommodated in a blade housing (not illustrated) in the frame 12b.

A charging unit 26 and a battery 30 are stored in a rear part of the vehicle body 12. Two charging terminals 32 are juxtaposed in front of the frame 12b. Contact points 32a are installed inside the two charging terminals 32, respectively.

The charging terminal 32 is connected to the charging unit 26 using a lead wire, and the charging unit 26 is connected to the battery 30 using a lead wire. The work motor 20 and the traveling motor 24 are each connected to the battery 30 using a lead wire.

Magnetic sensors 34 are arranged on the left and right sides of the front end of the work machine 100, respectively. A contact sensor 36 is arranged on the frame 12b. The contact sensor 36 detects, for example, a coupling state between the frame 12b and the chassis 12a. When the frame 12b comes into contact with another object, the frame 12b separates from the chassis 12a. In this case, the contact sensor 36 outputs a contact detection signal indicating the contact to the ECU 42.

A storage box is provided near a center of the work machine 100, and the ECU 42 and the communication unit 64 are arranged on a board 40 received inside the storage box. The ECU 42 is a control device that controls an operation or functions of the work machine 100. The ECU 42 includes a microcomputer, and the microcomputer includes a processor and a storage medium. The processor is, for example, a central processing unit (CPU). As the storage medium, a read only memory (ROM), a random access memory (RAM), and the like are included. The processor functions as a control unit for reading a control program stored in advance in the ROM, executing a process instructed by various instructions (commands) described in the read control program, and exerting a function of the work machine 100. In the present application, executing the process instructed by the instruction described in the control program may be simply referred to as "to execute the program", "execution of the program", or the like.

The communication unit 64, a yaw sensor 44, an acceleration sensor 46 are stored in the storage box. The communication unit 64 can transmit and receive various types of data (including the height measurement signal) to and from the other work machine 100 by using a predetermined communication scheme. The communication unit 64 includes, for example, a communication interface. The communication unit 64 can use, for example, a scheme defined in IEEE802.11, a 4th generation mobile communication system, a 5th generation mobile communication system, or the like, as the communication scheme.

The yaw sensor 44 and the acceleration sensor 46 are arranged to be close to the ECU 42. The yaw sensor 44 detects an angular velocity (a yaw rate) around the rotation shaft in a height direction at a centroid position of the work machine 100, and outputs a detected yaw rate signal to the ECU 42. The acceleration sensor 46 detects a three-dimensional acceleration acting on the work machine 100, and outputs an acceleration signal indicating the detected acceleration to the ECU 42.

A wheel speed sensor that detects a wheel speed, which is a rotational speed of the rear wheel 14b, is arranged in the vicinity of the rear wheel 14b, and the wheel speed sensor outputs a wheel speed signal indicating the wheel speed to the ECU 42. A lift sensor 52 is arranged between the chassis 12a and the frame 12b. When the frame 12b is lifted from the chassis 12a and separated from the chassis 12a, the lift sensor 52 detects the lift of the chassis 12a. The lift sensor 52 outputs a lift signal indicating the detected lift to the ECU 42.

A current and voltage sensor 54 is arranged in the battery 30 to detect a remaining amount of power stored in the battery 30. The current and voltage sensor 54 outputs a remaining amount signal indicating the detected remaining amount to the ECU 42. A surface of the frame 12b has a notched shape as a whole, and a main switch 56, an emergency stop switch 60, and the display 62 are installed. The main switch 56 is a switch for instructing whether or not the operation is possible (on/off) according to an operation with respect to the main switch 56. The emergency stop switch 60 is a switch for instructing the stop of the operation through an operation. The main switch 56 outputs an operation instruction signal for instructing whether or not the operation is possible to the ECU 42. The emergency stop switch 60 outputs a stop instruction signal for instructing stop of the operation to the ECU 42. The display 62 displays various types of display information input from the ECU 42. The display 62 displays, for example, a work mode in operation at that point in time.

The charging terminal 32 of the work machine 100 is connected to a charger installed in a charging station. The charger is connected to a commercial power source and can charge the work machine using the charging terminal 32. AC power is applied to the charging station using an area wire and a magnetic field is generated around the area wire.

The work of the work machine 100, that is, a lawn mowing work will be described. When pressing is detected, the main switch 56 outputs an operation start instruction signal indicating the start of operation to the ECU 42. When the operation start instruction signal is input from the main switch 56, the ECU 42 starts the work mode as an operation mode and mows a lawn as a predetermined work. In lawn mowing, a work target object is not necessarily limited to lawn, but may also include objects that can be mowed by the blade 16 regardless of other types of natural objects such as lawn or artificial objects. When the main switch 56 detects pressing of the own portion, the main switch 56 outputs an operation end instruction signal indicating end of the operation to the ECU 42. When the operation end instruction signal is input from the main switch 56, the ECU 42 ends the work mode as the operation mode and ends the lawn mowing.

In the work mode, the ECU 42 calculates an energization control value so that the wheel speed detected by the wheel speed sensor 50 becomes a predetermined value, and outputs the calculated energization control value to a driver 24a. The driver 24a supplies the traveling motor 24 with power according to the energization control value input from the ECU 42. A driver 20a supplies the work motor 20 with the power according to the energization control value input from the ECU 42. Accordingly, the ECU 42 can control the traveling of the own machine within a predetermined work area. More specifically, the ECU 42 causes the own machine to travel in the work area execute the work, and the magnetic sensor 34 detects a magnetic field strength generated in the vicinity of the area wire and outputs a magnetic field strength signal indicating the detected magnetic field strength to the ECU 42. The ECU 42 determines whether the own machine is traveling in the predetermined work area or has exited the work area on the basis of the magnetic field strength signal input from the magnetic sensor 34. When the ECU 42 determines that the own machine has exited the predetermined work area, the traveling direction indicated by the yaw rate signal input from the yaw sensor 44 is changed by a predetermined angle. Accordingly, the traveling direction of the work machine 100 is returned to the work area.

In the above description, the case in which the work machine 100 is caused to travel so that the ECU 42 does not escape from the work area surrounded by the area wire has been taken as an example, but the present invention is not limited thereto. The work machine 100 may include a position information acquisition unit (not illustrated) that acquires a position of the own machine, and causes map data indicating a work area assigned to the own machine to be stored in the ECU 42 in advance. The position information acquisition unit sequentially acquires the position of the own machine, and outputs position information indicating the acquired position to the ECU 42. The ECU 42 refers to the map data and determines whether or not the position indicated by the position information input from the position information acquisition unit is in a range of the work area indicated by the map data. When the ECU 42 determines that the position is in the range of the work area, the ECU 42 does not change the traveling direction. When the ECU 42 determines that the position is out of the range of the work area, the ECU 42 specifies, as a target point, any position in the work area (for example, any one of a latest contact point of the work area from a position indicated by the position information at a current point in time (a current position) and a centroid point of the work area), and determines a direction of the target point with a current position as a reference point to be the traveling direction. The ECU 42 controls the driver 24a so that the work machine 100 travels in the traveling direction determined by the above scheme.

The position information acquisition unit includes, for example, any one or both of a global positioning system (GPS) and an encoder. The GPS measures a latitude and longitude indicating the position of the own part on the basis of an arrival time difference between reference signals that are transmitted from at least three GPS satellites orbiting the earth. The position information acquisition unit converts the measured latitude and longitude to a position represented by two-dimensional coordinate values of a coordinate system of the map indicated by the map data.

The encoder determines a vehicle speed and a traveling direction on the basis of left and right wheel speeds detected by the wheel speed sensor 50, and integrates the determined vehicle speed until the own machine reaches a vehicle speed and a traveling direction at a current point in time from a known reference point in the traveling direction, to determine the position of the own machine. The position information acquisition unit may use the position measured by the GPS as the known reference point.

The left and right rear wheels 14b can be independently driven by the traveling motor 24 in the same direction or opposite directions. For example, when the left and right traveling motors 24 are rotated forward at the same rotation speed, the work machine 100 goes straight forward. When the left and right traveling motors 24 are rotated forward at different rotation speeds, the work machine 100 turns in a direction in which the rotation speed of the rear wheel 14b is lower. When one of the left and right traveling motors 24 is rotated forward and the other is rotated backward, the left and right rear wheels 14b also rotate in that direction and thus, the work machine 100 turns on the spot. The ECU 42, for example, changes the traveling direction of the own machine each time the own machine reaches an area wire forming an outer edge of the work area while traveling in the work mode, so that the own machine travels in the work area, and causes the blade 16 to be rotated for the work.

The ECU 42 monitors the remaining amount signal input from the current and voltage sensor 54 in the work mode, and changes the operation mode to the feedback mode when the remaining amount indicated by the remaining amount signal drops to a predetermined charging target value. In the feedback mode, the ECU 42 causes the work machine 100 to travel along the area wire until the work machine 100 reaches the charging station. Here, it is assumed that the charging station is installed along the area wire. The ECU 42 causes the contact point 32a of the charging terminal 32 to come into contact with a charging terminal of the charger so that the battery 30 is charged with power. The ECU 42 ends the feedback mode when the contact point 32a is brought into contact with the charging terminal of the charger so that power is detected.

When the operation mode is the work mode or the feedback mode, when the contact detection signal is input from the contact sensor 36, when the lift signal is input from the lift sensor 52, and when the stop instruction signal is input from the emergency stop switch 60, the ECU 42 stops the work motor 20 and the traveling motor 24 and stops traveling and working.

Figure 5:
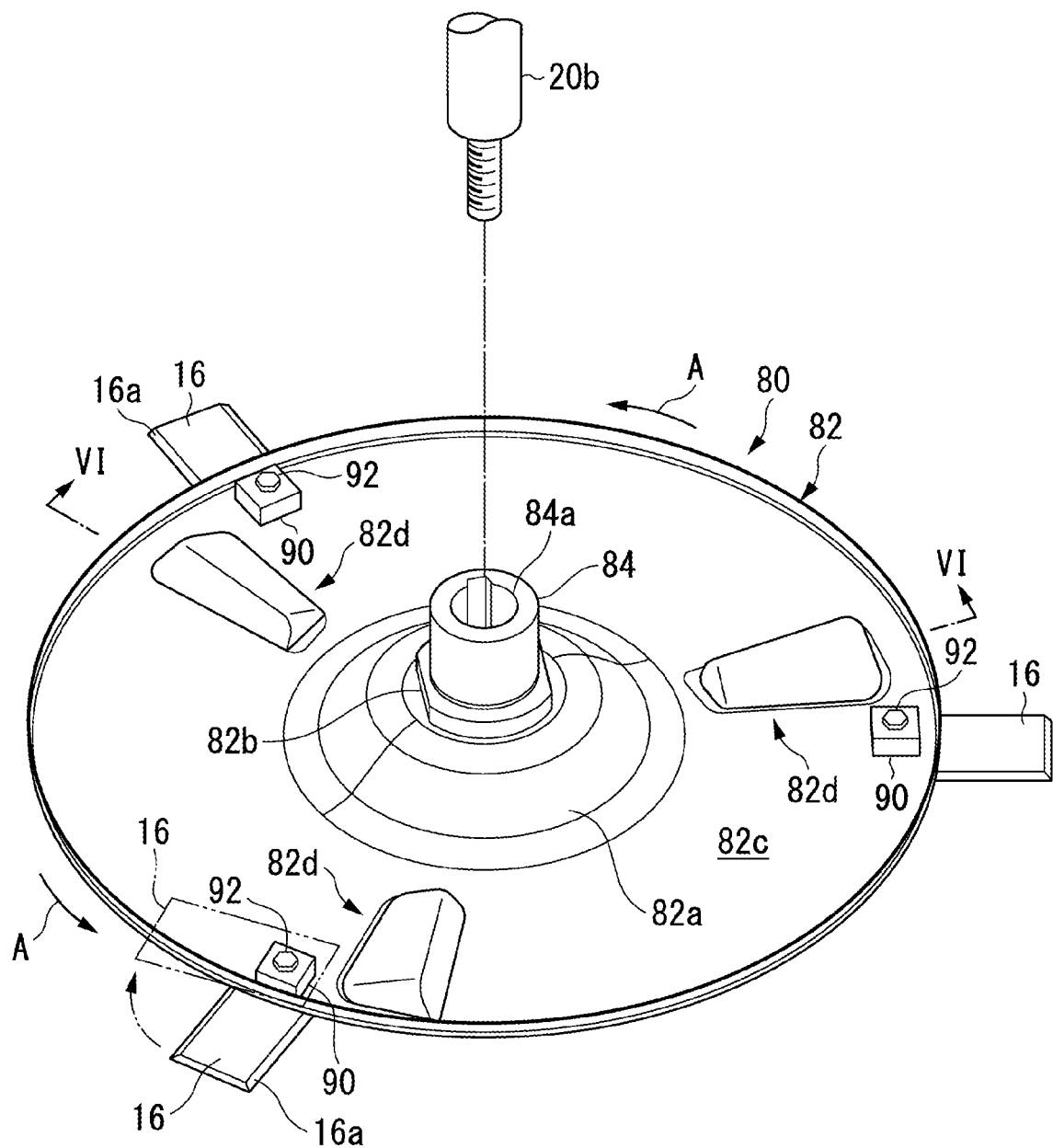
FIG. 5 is a perspective view illustrating a blade according to the first embodiment.

Next, a connection structure between the blade 16 and the work motor 20 will be described. FIG. 5 is a perspective view illustrating the blade according to the present embodiment. A connection member 80 is connected to a drive shaft 20b of the work motor 20. The connection member 80 includes a blade disc 82 and a holder 84. The blade disc 82 has a disc-like shape and is made of an iron-based metal material. The holder 84 has a substantially cylindrical shape. A truncated cone portion 82a having a substantially truncated cone shape is formed in a central portion of a main surface of the blade disc 82, and an insertion hole 82b through which the drive shaft 20b of the work motor 20 can be inserted is formed at a center of the truncated cone portion 82a. In the blade disc 82, a fan 82d is integrally formed in a flat portion 82c, which is a flat portion around the truncated cone portion 82a.

An insertion hole 84a through which the drive shaft 20b can be inserted is bored in the holder 84. A male screw is threaded into a lower end portion of the drive shaft 20b. Accordingly, the drive shaft 20b is inserted into the insertion hole 84a of the holder 84 and the insertion hole 82b of the blade disc 82 while being positioned with a key (not illustrated), and fastened and fixed with a nut so that the blade disc 82 is fixed to the drive shaft 20b of the work motor 20. Each of the individual blades 16 has a substantially rectangular shape, and a blade is formed in an end portion 16a in a rotation direction A when the individual blade 16 is attached to the blade disc 82. The blade 16 is made of, for example, tool steel.

The three blades 16 are attached to an outer circumference of the blade disc 82 at equal angular intervals. A nut portion 90 having a hole in which a female screw is threaded is formed at a position closer to the outer circumference than the truncated cone portion 82a of the flat portion 82c of the blade disc 82, which is a position separated from the fan 82d by a predetermined distance on the side opposite to the rotation direction A. On the other hand, a bolt hole 16b having a diameter larger than that of a threaded portion 92a of a bolt 92 is bored in the blade 16. The blade 16 is rotatably attached to the blade disc 82 by the bolt 92 being inserted into the bolt hole 16b of the blade 16 and the nut portion 90 of the blade disc 82 and fastened and fixed.

When the blade 16 and the connection member 80 are rotated in the rotation direction A by the drive shaft 20b of the work motor 20, the blade 16 is rotated while being projected in an outer diameter direction by centrifugal force due to the rotation, such that the lawn can be mowed. Further, when the connection member 80 is rotated, a negative pressure is generated by the fan 82d to obtain a rectifying effect, such that the lawn can be mowed by the blade 16 while standing.

Therefore, the ECU 42 acquires the height of the blade 16 notified from the other work machine 100 as a reference value for the height, and causes the height adjustment mechanism 22 to perform adjustment so that the height of the blade 16 measured by the own machine approximates or matches the reference value. Therefore, since a difference in height of the blade 16 between the work machines 100 is reduced or eliminated, mowing unevenness as a difference in the finished state due to the difference in height can be curbed or eliminated.

In the above description, the work system S1 includes the two work machines 100 capable of executing common work within a predetermined work area, and the number of adjustment machines is one as an example, but the present invention is not limited thereto. The number of work machines 100 in the work system S1 may be three or more. In addition, the number of adjustment machines may be two or more.

Second Embodiment

Next, a second embodiment of the present invention will be described. Configurations common to the above embodiment are denoted by the same reference signs, and description thereof will be incorporated unless otherwise specified. Hereinafter, differences from the above embodiment will be mainly described. A work system S1 according to the present embodiment also includes two or more work machines 100, but in particular, a reference machine may not be provided. In the present embodiment, each work machine 100 uses a height of a predetermined sign as a reference value.

Figure 6:
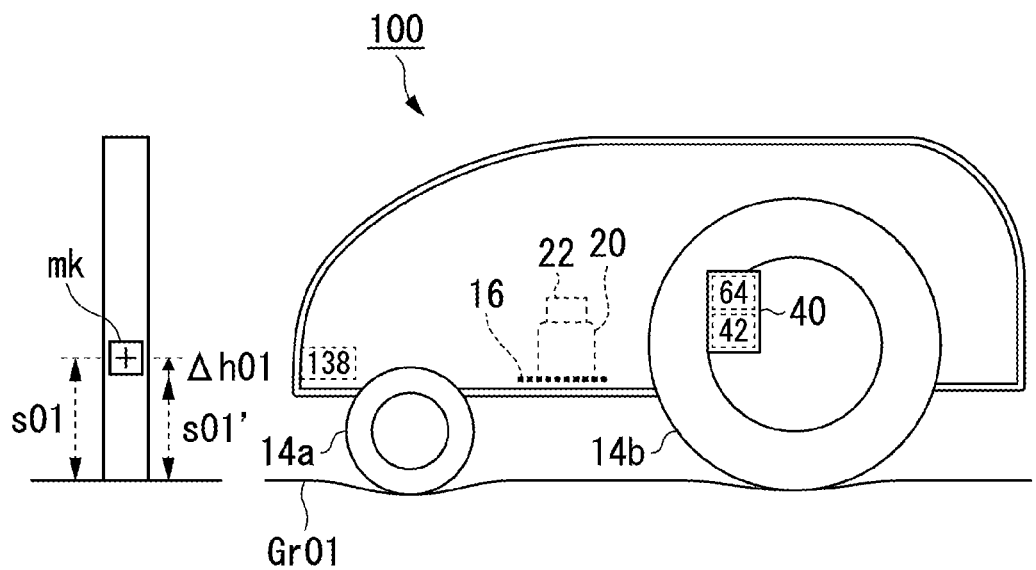
FIG. 6 is a side view illustrating an example of a work machine according to a second embodiment.

FIG. 6 is a side view illustrating an example of the work machine 100 according to the present embodiment. In the work machine 100 according to the present embodiment, a height sensor 138 is fixedly installed at a front end of the vehicle body 12 in place of the height sensor 38 or together with the height sensor 38. The height sensor 138 measures a height s01' of a predetermined sign displayed at a reference value height s01. As the sign, a predetermined pattern displayed on a surface of a structure having high rigidity and being parallel to a direction (for example, a vertical direction) intersecting a horizontal direction, such as a pillar installed in a work area, can be used. The height sensor 138 includes, for example, a camera that captures a two-dimensional image, an image processing unit that specifies a processing pattern and a position thereof represented by the captured image using a known image processing technique, and a height estimation unit that determines a height in global coordinates corresponding to the position specified on the image. The height sensor 138 outputs a height measurement signal indicating the measured height s01' to the ECU 42.

The ECU 42 determines a difference between a reference value s01 and the height s01' indicated by the height measurement signal input from the height sensor 138 as an adjustment amount Δh01. The ECU 42 outputs the height adjustment signal for instructing height adjustment with a determined adjustment amount Δh01 to a height adjustment mechanism 22. In the present embodiment, the height adjustment mechanism 22 adjusts a height of a blade 16 so that the adjustment amount Δh01 indicated by the height adjustment signal input from the ECU 42 is added. Here, the height adjustment mechanism 22 sets the indicated adjustment amount Δh01 as an initial value of a difference between the target value and an observed value of the height of the blade 16, and adjusts the height of the blade 16 so that the difference recursively approximates to zero.

Therefore, in each of the plurality of work machines 100 that enable common work to be executed in the work area, the height of the blade 16 from a ground surface Gr01 is adjusted to approximate or match the height s01 of the sign.

Therefore, in the work system S1, mowing unevenness that may occur between the plurality of work machines 100 is reduced or eliminated.

Third Embodiment

Next, a third embodiment of the present invention will be described. Configurations common to the above embodiments are denoted by the same reference signs, and description thereof will be incorporated unless otherwise specified. Hereinafter, differences from the above embodiments will be mainly described. A work system S1 according to the present embodiment includes two or more work machines 100 and a work machine management device 300.

Figure 7:
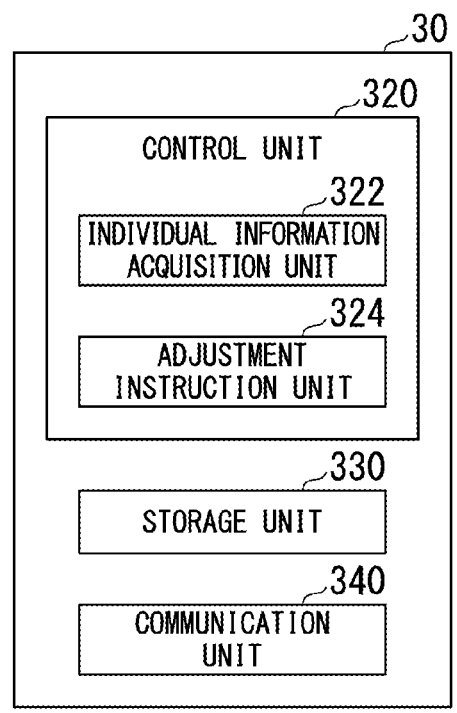
FIG. 7 is a block diagram illustrating a functional configuration of a work machine management device according to a third embodiment.

FIG. 7 is a block diagram illustrating a functional configuration of the work machine management device 300 according to the present embodiment. The work machine management device 300 includes a control unit 320, a storage unit 330, and a communication unit 340. The control unit 320 controls various processes for exerting a function of the work machine management device 300, or execution thereof. The control unit 320 includes an individual information acquisition unit 322 and an adjustment instruction unit 324. The control unit 320 supports, for example, adjustment of the height of the blade 16 in the work machine 100, which is an adjustment machine. The control unit 320 adjusts the height of the blade 16 in the adjustment machine so that the height of the blade 16 approximates or matches the height of the blade 16 in the reference machine, as in the first embodiment.

The individual information acquisition unit 322 acquires individual information indicating states of members of the individual work machines 100. The individual information acquisition unit 322 receives a height measurement signal from the work machine 100 as an example of the individual information, and stores a height indicated by the received height measurement signal in the storage unit 330. Work machine identification information indicating the work machine 100 that is a transmission source set in advance may be included in the height measurement signal. Setting information such as an operation mode and parameters for each work machine 100 may be stored in the storage unit 330, and reference machine setting information indicating whether or not the own machine is a reference machine may be included in the setting information. The ECU 42 of the work machine 100 transmits the height measurement signal indicating the height measured by the height sensor 38 of the own machine to the work machine management device 300.

The adjustment instruction unit 324 can adjust the height of the blade 16 of the adjustment machine with the height of the blade 16 of the reference machine as a reference value, as in the first embodiment. The adjustment instruction unit 324 specifies the work machine, which is a transmission source, on the basis of work machine identification information included in the received height measurement signal, and refers to the work machine identification information stored in the storage unit 330 to determine whether or not the work machine 100, which is the transmission source, is the reference machine. When the work machine 100, which is a transmission source, is determined to be the reference machine, the adjustment instruction unit 324 determines the height indicated by the height measurement signal as the reference value. On the other hand, when a determination is made that the work machine 100, which is a transmission source, is not the reference machine but an adjustment machine, the adjustment instruction unit 324 transmits a height adjustment signal indicating a reference value determined for the work machine 100 as a height control target to the work machine 100 serving as the adjustment machine, which is the transmission source. The ECU 42 of the work machine 100, which is a transmission destination of the height adjustment signal, outputs the height adjustment signal received from the work machine management device 300 to the height adjustment mechanism 22.

By transmitting the height adjustment signal to the work machine 100, which is a transmission source of the height measurement signal, the adjustment instruction unit 324 may cause the height of the blade 16 of the work machine 100 to be adjusted on the basis of a known reference value and a measured value of the height of the sign, as in the second embodiment. In that case, the adjustment instruction unit 324 may omit a process of determining whether or not the work machine 100, which is the transmission source, is the reference machine, or the reference value of the height of the blade 16 may not be included in the height adjustment signal that is transmitted to the work machine 100. The ECU 42 of the work machine 100 outputs the height adjustment signal for instructing height adjustment to the height adjustment mechanism 22 with the difference between the height of the sign measured by the height sensor 138 and a predetermined reference value as the adjustment amount $\Delta h01$.

As described above, the work machine management device 300 transmits the height adjustment signal to the work machine 100. Therefore, in the present embodiment, the ECU 42 may not autonomously adjust the height of the blade 16 in each work machine 100.

When the height adjustment is completed using any of the above schemes, the height adjustment mechanism 22 transmits height adjustment completion information indicating the completion to the work machine management device 300 via the ECU 42 of the work machine 100 and the communication unit 64. When the adjustment instruction unit 324 receives the height adjustment completion information from the work machine 100, the adjustment instruction unit 324 associates the received height adjustment completion information with a date and time thereof, and stores resultant information with the resultant information included in the individual information of the work machine 100.

The individual information acquisition unit 322 may acquire element information indicating other elements that affect the work of the work machine 100, include the element information in the individual information, and store the resultant information in the storage unit 330. The individual information acquisition unit 322 acquires element information of the work machine 100 that has performed maintenance according to an operation of the user with respect to the own device or the work machine 100 at the time of maintenance (for example, management such as replacement and inspection of parts). Examples of requirements that affect the finish of lawn mowing include diameters of the wheels 14, and a relative height of the blade 16 with respect to the height adjustment mechanism 22. The height of the blade 16 from the ground surface is likely to change due to the replacement of consumables such as the wheel 14 and the blade 16. Therefore, the individual information acquisition unit 322 acquires maintenance information indicating a maintenance date and time of replacement or the like of consumables as an example of the element information. Such maintenance can be a factor that significantly changes the height from the ground surface to the blade 16.

The adjustment instruction unit 324 monitors the individual information stored in the storage unit 330 and specifies the work machine 100 of which the height has not been adjusted after the last maintenance. The adjustment instruction unit 324 can specify, for example, the work machine 100 of which the date and time indicated in last management information is later than the date and time corresponding to the last height adjustment completion information (hereinafter, final adjustment date and time). The adjustment instruction unit 324 may transmit the height adjustment signal to the specified work machine 100. Accordingly, the height is adjusted after maintenance.

The individual information may include lot identification information indicating a production lot (hereinafter, a lot) in which each work machine 100 has been manufactured. The lot refers to a unit of manufacture of predetermined products at one time. Since a specification of the entire work machine 100 or the members may differ from lot to lot, the lot identification information is useful for specifying of a state of members not used after manufacture. The storage unit 330 may store lot information indicating a degree of change over time in properties of the members that is used for work of the work machine 100 for each lot. The lot information may include, for example, property data indicating an amount of change in the height of the blade 16 from the ground surface dependent on an elapsed time from a later date and time between a manufacturing time and a final adjustment date and time of the work machine 100 manufactured in the lot (hereinafter, an immediately previous adjustment date and time, or the like) to a current point in time. In general, the amount of change from the height at the manufacturing time point or the immediately previous adjustment time point tends to increase as an elapsed time from any of the points in time becomes longer.

The adjustment instruction unit 324 refers to property data related to the lot of the work machine 100 to specify the amount of change corresponding to an elapsed time from the final adjustment date and time or the like to the current point in time. When the specified amount of change exceeds a predetermined limit value of the amount of change, the adjustment instruction unit 324 may transmit the height adjustment signal to the work machine 100. Accordingly, adjustment can be performed on the change in the height of the blade 16 that may occur over time in each work machine 100 without an operation of the user. In this adjustment, the difference in height of the blade 16 among the plurality of work machines 100 can be reduced or eliminated.

The amount of change in the height of the blade 16 may also depend on a work time of the work machine 100. Therefore, the property data may indicate the amount of change in the height of the blade 16 dependent on a work time from the immediately previous adjustment date or the like to a current point in time in place of the elapsed time or together with the elapsed time.

Therefore, the adjustment instruction unit 324 specifies a work time of the work machine 100 on the basis of work start information and work end notification information notified from the work machine 100. More specifically, when the operation start instruction signal is input from the main switch 56, the ECU 42 of the work machine 100 transmits the work start information indicating the start of work to the work machine management device 300. When the ECU 42 of the work machine 100 detects the end of work, the ECU 42 of the work machine 100 transmits work end information indicating the end of work to the work machine management device 300.

For example, when the operation end instruction signal, the lift signal, the stop instruction signal, or an operation end signal is input as described above or when the operation mode is changed from the work mode to the feedback mode, the ECU 42 can detect the end of work.

When the adjustment instruction unit 324 receives the work start information from the work machine 100, the adjustment instruction unit 324 associates the work start information with a date and time at that point in time and records the resultant information with the resultant information included in the individual information of the work machine 100. When the adjustment instruction unit 324 receives the work end information from the work machine 100, the adjustment instruction unit 324 associates the work end information with a date and time at that point in time, and records the resultant information with the information included in the individual information of the work machine 100. The adjustment instruction unit 324 can specify a period from a date and time corresponding to a certain work start information to a date and time corresponding to next work end information as one work period. The adjustment instruction unit 324 can determine a sum of respective work periods from immediately previous adjustment date and time or the like to the current point in time as the work time.

When the property data indicates the amount of change in the height of the blade 16 dependent on the work time, the adjustment instruction unit 324 refers to the property data to specify a displacement corresponding to the work time within the elapsed time from the immediately previous adjustment date and time or the like to the current point in time. When the property data indicates the elapsed time from the immediately previous adjustment date and time or the like and the amount of change in the height of the blade 16 dependent on the work time, the adjustment instruction unit 324 refers to the property data and specifies an elapsed time from the immediately previous adjustment date and time or the like to the current point in time and a displacement corresponding to the work time within the elapsed time. When the specified displacement exceeds a predetermined limit value of the displacement, the adjustment instruction unit 324 may transmit the height adjustment signal to the work machine 100. Accordingly, the height is adjusted in consideration of the dependence on the work time of the height, in addition to the elapsed time.

The individual information acquisition unit 322 may cause each work machine 100 to try the work separately from the instruction to start the work, and acquire detection information indicating a situation of the tried work. The work machine 100 includes, for example, a camera (not illustrated) at a position closer to a rear end of a bottom surface of the vehicle body 12 than the blade 16, as a detection unit for acquiring detection information.

The individual information acquisition unit 322 transmits the height adjustment signal to the work machine 100 in response to an operation of the user with respect to the own device. The ECU 42 of the work machine 100 changes the operation mode to the work mode and causes the camera to start capturing of an image of the ground surface after traveling. The camera transmits an image signal indicating the captured image as detection information to the work machine management device 300 via the ECU 42. The individual information acquisition unit 322 of the work machine management device 300 performs a known image recognition process on the image signal received from the work machine 100, and detects (evaluates) lengths of the lawn left unmown from the ground surface. The individual information acquisition unit 322 records evaluation information indicating an average value (hereinafter referred to as an average length) of the lengths detected by the work machine 100, with the evaluation information included in the individual information, in association with the height of the blade 16 from the ground surface. The individual information acquisition unit 322 may calculate parameters of a predetermined function (for example, a linear function or a quadratic function) indicating relevance between the average length indicated by the evaluation information and the height of the blade indicated by the individual information as relevance parameters, and store the calculated relevance parameters in the storage unit 330 as evaluation-related information.

The adjustment instruction unit 324 may refer to the evaluation-related information, set a common predetermined average length of the work machine 100 as a reference value for the length, and set the height of the blade 16 corresponding to the reference value for the length as the reference value. The adjustment instruction unit 324 transmits the height adjustment signal indicating the determined reference value as a height control target to the work machine 100 serving as the adjustment machine. The reference value of the length may be set in advance in the adjustment instruction unit 324 or may be set according to an operation of the user. With this scheme, it is possible to make lengths of lawn left unmown uniform among the plurality of work machines 100.

Figure 8:
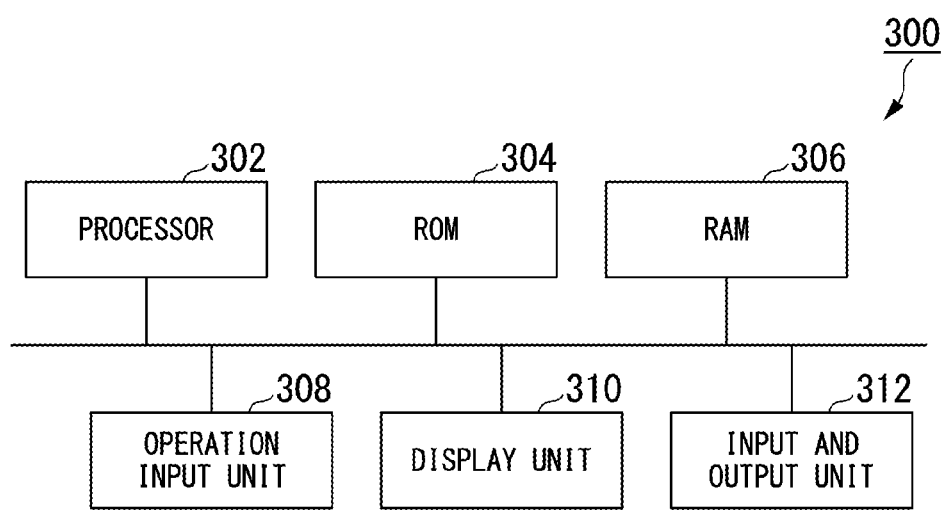
FIG. 8 is a schematic block diagram illustrating a hardware configuration example of the work machine management device according to the third embodiment.

Next, a hardware configuration example of the work machine management device 300 according to the present embodiment will be described. FIG. 8 is a schematic block diagram illustrating a hardware configuration example of the work machine management device 300 according to the present embodiment. The work machine management device 300 is a computer including a processor 302, a ROM 304, a RAM 306, an operation input unit 308, a display unit 310, and an input and output unit 312. The processor 302, the ROM 304, the RAM 306, the operation input unit 308, the display unit 310, and the input and output unit 312 are connected to each other.

The processor 302 reads, for example, a program or various types of data stored in the ROM 304, executes the program, and controls the operation of the work machine management device 300. The processor 302 is, for example, a CPU. The processor 302 may execute a predetermined program to realize a function of each functional unit, such as the control unit 320. In the present application, executing processes instructed by various instructions (commands) described in the program may be referred to as "execution of the program" or "to execute the program".

The ROM 304 stores, for example, a program to be executed by the processor 302. The RAM 306 functions as, for example, a work area for temporarily storing various types of data and programs that are used in the processor 302. The storage unit 330 is realized by the ROM 304 and the RAM 306. The operation input unit 308 is an input device that receives an operation of the user, generates an operation signal according to the received operation, and outputs the generated operation signal to the processor 302. The operation input unit 308 corresponds to, for example, a pointing device such as a mouse or a keyboard. In the present application, operating according to information indicated by the input operation signal may be simply referred to as "to operate according to the operation".

The display unit 310 includes, for example, a display for displaying various types of display information on the basis of, for example, an image signal input from the processor 302. The input and output unit 312 includes, for example, an input and output interface that connects to another device by wire or wirelessly and enables input and output of various types of data to and from the other device. The input and output unit 312 includes a communication module that connects to a network by wire or wirelessly, and enables transmission and reception of various types of data to and from other devices connected to the network. The communication unit 340 is realized by the input and output unit 312.

As described above, the control device (for example, the ECU 42 or the work machine management device 300) according to the present embodiment includes a control unit (for example, the processor of the ECU 42 or the control unit 320) configured to acquire individual information indicating a state (for example, the height of the blade 16) of a predetermined member (for example, the blade 16) of a work machine (for example, the work machine 100) configured to execute work using the predetermined member, and instruct a state adjustment mechanism (for example, the height adjustment mechanism 22) configured to adjust the state to adjust the state so that a difference between the state indicated by the acquired individual information and a reference value of the state common to other work machines is reduced. With this configuration, the difference in the state of the member among the plurality of work machines that perform the common work is reduced or eliminated. Therefore, it is possible to make the finished state of the work uniform among the plurality of work machines.

The control unit may receive individual information from another work machine (for example, a reference machine) and adopt the state of the member indicated by the received individual information as the reference value. With this configuration, the state of the member of the own machine can be approximated or matched with states of the members of the other work machines.

The control unit may acquire measurement information on a state of a predetermined sign that gives the reference value, and instructs the state adjustment mechanism to adjust the state indicated by the individual information so that a difference between the state indicated by the measurement information and the reference value is reduced. With this configuration, the state of the member of the own machine can be approximated or matched with the reference value given by the sign.

The control unit may analyze evaluation-related information indicating a relationship between the individual information and evaluation information indicating a target object state (for example, lengths of lawn), the state being a state of the work target object after work, and determine the state indicated by the individual information corresponding to a predetermined target object state common to other work machines to be the reference value on the basis of the analyzed evaluation-related information. With this configuration, the reference value of the state of the member is given on the basis of the state of the work target object after the common work among the plurality of work machines, and the state of the member is adjusted to approximate or match the reference value. Therefore, it is possible to further reduce the difference in the finished state of the work due to an individual difference in the configuration of the work machine.

The control unit may acquire at least an elapsed time from a date and time when the state of the member is last adjusted to a current point in time, refer to property data indicating a time change in the state of the member to determine an amount of change (for example, a displacement) of the state corresponding to the acquired elapsed time, and instructs the state adjustment mechanism to adjust the state of the member when the determined amount of change exceeds a predetermined limit value of the amount of change. With this configuration, the state of the member in each work machine is adjusted so that the amount of change in the state of the member over time does not exceed the predetermined limit value of the amount of change. Therefore, it is possible to keep the state of the member within a range defined by the limit value as much as possible among the plurality of work machines.

Each work machine may include a car body (for example, the vehicle body 12) having wheels (for example, the wheels 14) traveling on a ground surface and the state adjustment mechanism installed therein, a cutter blade (for example, the blade 16), the state adjustment mechanism being connected to the cutter blade, and a height detection unit (for example, the height sensors 38 and 138) configured to detect a height of the cutter blade as the state of the member, wherein the state adjustment mechanism may be a lawn mower that is a height adjustment mechanism configured to adjust the height of the cutter blade. With this configuration, a difference in height of the cutter blades among the plurality of work machines is reduced or eliminated. Therefore, lengths of the lawn after mowing as the finished state of the work are made uniform among the plurality of work machines, and moving unevenness is reduced or eliminated.

Although the embodiments of the present invention have been described in detail with reference to the drawings, the specific configuration is not limited to the above, and various design changes or the like can be made without departing from the gist of the present invention.

For example, the ECU 42 of the work machine 100 may be configured as a control device that can be attached to and detached from other constituent members of the work machine 100.

The work machine management device 300 may be configured as a single control device integrated with the ECU 42 of at least one work machine 100, and the processor of the ECU 42 may have a function of the control unit 320. In this case, transmission and reception of various types of data between the ECU 42 and the control unit 320 become input and output inside the control device, and a configuration or a process redundant due to the integration, such as the communication unit 340, may be omitted.

Although the case in which the work machine 100 is a self-propelled lawn mower having a configuration in which self-propelled lawn mower arbitrarily travels in a work area defined by an area wire has been taken as an example, the work machine 100 may have a function of acquiring a position of the work machine 100 and a surrounding environment, creating an environmental map, and planning a route on the basis of the created environmental map. The work machine 100 may travel on the basis of an instruction such as a direction or acceleration and deceleration transferred wirelessly or by wire or may travel according to a manual operation of an administrator without having power.

The work machine 100 is not limited to lawn mowing, and the present invention can be applied to any machine as long as the machine is a machine that executes work causing a change in a state of a work target object on a surface of a work area on which the work machine 100 travels, through an action of the members of the work machine 100, such as a weeding machine that performs weeding or a vacuum cleaner that collects and removes minute objects or wipes a surface. The state of the member related to the work is not limited to the position such as the height, and may be a thing such as wear of the member in which an individual difference may occur between the work machines 100 due to the elapse of time, the work time, or the like, but a state of a work target object after work can be controlled through adjustment of the member.

What is claimed is:

1. A control device comprising:
a control unit configured to acquire individual information indicating a state of a predetermined member of a work machine configured to execute work using the predetermined member, and instruct a state adjustment mechanism configured to adjust the state of the predetermined member to adjust the state of the predetermined member so that a difference between the state of the predetermined member indicated by the individual information and a reference value of a state common to another state of another member of another work machine is reduced,
wherein the control unit receives another individual information indicating the another state of the another member of the another work machine from the another work machine, adopts the another state of the another member indicated by the received another individual information as the reference value, and instructs the state adjustment mechanism to adjust the state of the predetermined member.

2. The control device according to claim 1, wherein the control unit acquires measurement information on a state of a predetermined sign that gives the reference value, and instructs the state adjustment mechanism to adjust the state indicated by the individual information so that a difference between the state indicated by the measurement information and the reference value is reduced.

3. The control device according to claim 1, wherein the control unit analyzes evaluation-related information indicating a relationship between the individual information and evaluation information indicating a target object state, the state being a state of the work target object after work, and determines the state indicated by the individual information corresponding to a predetermined target object state common to the another work machine to be the reference value on the basis of the evaluation-related information.

4. The control device according to claim 1, wherein the control unit acquires at least an elapsed time from a date and time when the state is last adjusted to a current point in time, refers to property data indicating a time change in the state of the member to determine an amount of change of the state corresponding to the acquired elapsed time, and instructs the state adjustment mechanism to adjust the state when the determined amount of change exceeds a predetermined limit value of the amount of change.

5. The control device according to claim 1,
wherein the work machine includes
a car body having wheels traveling on a ground surface and the state adjustment mechanism installed therein;
a cutter blade, the state adjustment mechanism being connected to the cutter blade; and
a height detection unit configured to detect a height of the cutter blade as the state, and
the state adjustment mechanism is a height adjustment mechanism configured to adjust the height.

6. A work system comprising:
a plurality of the work machines; and
the control device according to claim 1.

7. A work machine comprising:
a control unit configured to acquire individual information indicating a state of a member configured to execute predetermined work, and instruct a state adjustment mechanism configured to adjust the state of the member to adjust the state of the member so that a difference between the state of the member indicated by the individual information and a reference value of a state common to another state of another member of another work machine is reduced,
wherein the control unit receives another individual information indicating the another state of the another member of the another work machine from the another work machine, adopts the another state of the another member indicated by the received another individual information as the reference value, and instructs the state adjustment mechanism to adjust the state of the member.

8. A control method in a control device, the control method comprising:
acquiring individual information indicating a state of a predetermined member of a work machine configured to execute work using the predetermined member;
receiving another individual information indicating another state of another member of another work machine from the another work machine;
adopting the another state of the another member indicated by the received another individual information as a reference value; and
instructing a state adjustment mechanism configured to adjust the state of the predetermined member to adjust the state of the predetermined member so that a difference between the state of the predetermined member indicated by the individual information and the reference value is reduced.

* * * * *